United States Patent [19]

Schönfelder et al.

[11] 4,444,973
[45] Apr. 24, 1984

[54] COATINGS FOR THERMOPLASTICS

[75] Inventors: Manfred Schönfelder; Helmut Steinberger, both of Leverkusen, Fed. Rep. of Germany

[73] Assignee: Bayer Aktiengesellschaft, Leverkusen, Fed. Rep. of Germany

[21] Appl. No.: 411,751

[22] Filed: Aug. 26, 1982

[30] Foreign Application Priority Data

Sep. 5, 1981 [DE] Fed. Rep. of Germany ....... 3135184

[51] Int. Cl.$^3$ ............................................. C08G 77/04
[52] U.S. Cl. ...................................... 528/28; 528/32; 428/412; 428/447
[58] Field of Search .................... 528/32, 28; 428/412, 428/447

[56] References Cited

U.S. PATENT DOCUMENTS 4,315,091 2/1982 Steinberger et al. ................ 528/32

FOREIGN PATENT DOCUMENTS 17187 10/1980 European Pat. Off. .
2067582 7/1981 United Kingdom .

Primary Examiner—Theodore Morris
Attorney, Agent, or Firm—Sprung, Horn, Kramer & Woods

[57] ABSTRACT

The present invention relates to protective coating formulations, in particular to transparent abrasion-resistant and scratch-resistant coatings on transparent thermoplastic polymers, which coatings essentially consist of a hydrolyzed siloxane compound, a dispersion of colloidal silicon dioxide, etherified methylolmelamine, a blocked polyisocyanate, acetic acid and a polysiloxane terminated by hydroxyl groups.

3 Claims, No Drawings

COATINGS FOR THERMOPLASTICS

The present invention relates to protective coating formulations, in particular to transparent abrasion-resistant and scratch-resistant coatings on transparent thermoplastic polymers, chiefly on polycarbonate.

There is a considerable demand for unbreakable, light, transparent materials which, in contrast to glass, have a lower fragility and a lower specific weight. Such transparent materials and shaped articles can be prepared from polycarbonates, polymethyl methacrylates, cellulose esters, polystyrene or polyvinyl chloride. However, these materials have the disadvantage that they have a surface which is readily damaged and that they are swelled or incipiently dissolved on contact with organic solvents.

To avoid these disadvantageous properties of shaped articles, various processes have already been developed, for example processes for coating with a coating composition which contains as main constituents a hydrolysis product of tetraalkoxysilane and a copolymer of a fluoro-olefin with an omega-hydroxyalkyl vinyl ether (U.S. Pat. No. 3,429,845). In another process, shaped articles are coated with a hydrolysis product of an alkyltrialkoxysilane (U.S. Pat. No. 3,451,838). A further process uses, for the coating of shaped articles, partial hydrolyzates of tetraalkoxysilane and alkyltrialkoxysilanes (Japanese Patent Application 56,230/1973). Other proposals for the coating are based on the use of polysilicic acids together with acrylic copolymers and etherified methylolmelamines, which are intended to provide the treated surfaces with a high abrasion resistance and water resistance (Japanese Patent Application No. 34,214/1974). Instead of dissolved polysilicic acid it is also possible to use dispersions of colloidal silicic acid together with partial hydrolyzates of alkyltrialkoxysilanes (DE-OS (German Published Specificaton) No. 2,506,202, DE-OS (German Published Specification) No. 2,446,279, DE-OS (German Published Specification) No. 2,947,823, DE-OS (German Published Specification) No. 2,947,879, DE-OS (German Published Specification) No. 3,014,581 and DE-OS (German Published Specification) No. 3,014,772).

Materials which have been prepared by one of the processes described above could hitherto attain only a limited economic significance, since they are difficult to use, have a moderate resistance to moisture or are expensive. Furthermore, the elasticity and adhesion of the hardened coating film is not adequate for application purposes in which the coated shaped bodies are exposed to temporary changes in shape.

Attempts have also been made to improve the adhesion and film elasticity with combinations of aminoalkylalkoxysilanes with acryloxyalkylalkoxysilanes or vinylalkoxysilanes as well as with combinations of epoxyalkylalkoxysilanes with acryloxyalkylalkoxysilanes or vinylalkoxysilanes. However, coatings prepared from these materials have proved to have poor scratch resistance.

However, a coating produced by crosslinking an organopolysiloxane to a relatively high degree by using a hardening catalyst, is known to have poor frictional properties as a result of its high coefficient of friction. It is therefore important to improve the frictional properties, by providing a smoother coating surface, so that an improved abrasion resistance is also obtained.

In fields which are related to coating technology, it is known to use surface-active agents as levelling agents in order to obtain smooth coated surfaces. However, the known surface-active agents do not produce a satisfactory levelling effect in a coating solution which contains an organopolysiloxane. If, to improve the surface smoothness, a larger amount of surface-active agent is added, the adhesion property of the coating composition deteriorates compared with the basic material.

It has now been found that the addition of certain organooligosiloxanes of the formula:

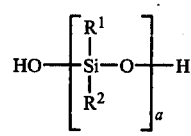

wherein
$R^1$ and $R^2$ denote lower alkyl groups, alkenyl groups or phenyl and
a denotes an average value between 1 and 25, to a coating composition, produces additional hardness and good frictional properties of the film without disadvantageously affecting other properties of the hardened film.

This finding is surprising insofar as it is known that additions of alkoxysilanes which are such that they can form linear molecular chains, lead to a lowering of the scratch resistance of coating formulations.

However, the additives according to the invention do not lead to a lowering but to an increase of the scratch resistance and to an improved surface smoothness.

The object of the present invention was to provide a coating composition which forms, on the surface of shaped bodies made of organic thermoplastics, such as, for example, polycarbonate or polymethyl methacrylate, a protective layer having a high surface hardness, scratch resistance, solvent resistance and great surface smoothness.

The object is achieved by the fact that the addition of organopolysiloxanes of the formula:

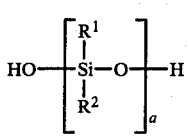

wherein
$R^1$ and $R^2$ independently of one another represent methyl, ethyl, propyl, phenyl or vinyl, and
a denotes an integer between 1 and 15, to the polysilicic acid component, improves the surface smoothness and the scratch resistance of the coating agent on the substrate, while the remaining properties of the coating are fully retained.

The invention relates to a coating composition which essentially consists of approximately:
(A) 10 to 40% by weight, relative to the total weight of the coating agent, of a partially hydrolyzed siloxane compound which is obtained by hydrolysis in water at about 50° to 80° C. for a reaction period of up to 12 hours of at least one of the compounds which follow:
(a) a hydrocarbon trialkoxysilane of the formula S'Si(OR")$_3$, wherein R' denotes an alkyl group having 1 to 4 carbon atoms, a phenyl group or vinyl group and R" denotes an alkyl group having 1 to 4 carbon atoms, and/or (b) co-condensation products of (a) and 1 to 40% by weight of a phenyltrialkoxysilane or vinyltrialkoxysilane, wherein the alkoxy group contains 1 to 4 carbon atoms, and/or (c) co-condensation products of 1 mol of (a) and 0.01 to 1 mol of a tetraalkoxysilane, wherein the alkoxy group contains 1 to 4 carbon atoms, and/or (d) co-condensation products of 1 mol of (a) and 0.05 to 1 mol of a dialkyldialkoxysilane, wherein the alkyl and alkoxy groups contain 1 to 4 carbon atoms, (B) 0 to 40% by weight, relative to the total weight of the coating composition, of an aqueous dispersion of colloidal silicon dioxide, (C) 0 to 5% by weight, relative to the total weight of the coating agent, of an etherified methylolmelamine, (D) 0.05 to 15% by weight, relative to the total weight of the coating composition, of a blocked polyisocyanate, (E) 0.5 to 30% by weight, relative to the total weight of the coating composition, of acetic acid, (F) 0.05 to 4% by weight, relative to the total weight of the coating composition, of a polysiloxane which is terminated by hydroxyl groups and has an average chain length of between 1 and 25, and (G) an inert organic solvent as the remainder.

The agent is applied to the surface of, for example, polycarbonate objects and hardened. The coated polycarbonate objects have excellent properties, such as surface hardness, scratch resistance, solvent resistance and resistance to crazing under stress.

The new coating agents according to the invention have a long pot life. They can be applied to the surface of shaped polycarbonate objects and hardened at a temperature of about 80° C. to about 130° C. in order to evaporate solvents contained therein and to obtain a condensation reaction.

Hydrocarbon trialkoxysilanes (1) are multifunctional siloxane compounds of the formula R'Si(RO")$_3$, wherein R' denotes an alkyl group having 1 to 4 carbon atoms, a phenyl group or vinyl group and R" denotes an alkyl group having 1 to 4 carbon atoms.

Methyltriethoxysilane is preferred. A partial hydrolyzate of hydrocarbon trialkoxysilanes is obtained by adding water to hydrocarbon trialkoxysilanes and heating the resulting material at a temperature of about 50° to 80° C. for about 1 to 10 hours. The preparation of such partial hydrolyzates is known in itself and described, for example in U.S. Pat. No. 3,451,838, DE-OS (German Published Specification) 1,923,290 and in U.S. Pat. No. 4,006,271.

A partially hydrolyzed co-condensation product which essentially contains 1 mol of a hydrocarbon trialkoxysilane as main component and 0.05 to 1 mol of a tetraalkoxy-(C 1 to C 4)-silane and additional component forms a coating having improved hardness.

A partially hydrolyzed co-condensation product of 1 mol of a hydrocarbon trialkoxysilane and 0.05 mol to 1 mol of a dialkyl-(C 1 to C 4)-dialkoxy-(C 1 to C 4)-silane forms a soft coating.

Additions of aqueous dispersions of colloidal silicon dioxide to a partially hydrolysed (co)-condensation product of an alkyltrialkoxysilane and, if appropriate, a tetraalkoxysilane, form coatings having improved hardness.

The etherified methylolmelamines which are optionally also used are industrial products which can be prepared in a manner which is in itself known. Specific examples of these compounds are hexaalkoxymethylmelamines, such as hexamethoxymethylmelamine, hexaethoxymethylmelamine, hexapropoxymethylmelamine, hexaisopropoxymethylmelamine, hexabutoxymethylmelamine and hexacyclohexyloxymethylmelamine.

An etherified methylolmelamine is preferably used in an amount of 0 to 150 parts by weight per 100 parts by weight (calculated as SiO$_2$) of the partial hydrolysis product of a tetraalkoxysilane compound or of colloidal silicic acid. The addition of more than 150 parts by weight of an etherified methylolmelamine lowers the adhesive strength and the hardness of the coating. The addition of an etherified methylolmelamine imparts to the coating not only hardness but also flexibility.

The masked polyisocyanates added are solvent-free, stable aqueous emulsions of blocked isocyanates, which may contain 2–4% by weight of polyethers and in which salts of diaminosulphonic acids are used as an emulsifying component. They are prepared by reacting any, preferably di- to tetra-functional, polyisocyanates desired with compounds which have molecular groupings which are reactive towards isocyanate groups. Possible compounds for this purpose are, inter alia, secondary or tertiary alcohols, C-H-acidic compounds, oximes, lactams, phenols, N-alkylamides, imides, imidazoles, triazoles or alkali metal bisulphites. C-H-acidic compounds, in particular compounds containing activated methylene groups, such as, for example, malonic acid dialkyl esters, acetic acid alkyl esters or acetylacetone, are preferably used.

The reaction of the polyisocyanate function with the molecular grouping which is reactive towards isocyanate groups is carried out in the presence of certain quantities of aromatic, aliphatic or araliphatic diaminosulphonic acids, or alkali metal salts or ammonium salts thereof.

The blocked polyisocyanates used can be obtained by reacting polyisocyanates with blocking agents, such as, for example, malonic acid diethyl ester or acetic acid ethyl ester, in a reaction which is in itself known. The solubility or dispersibility of the blocked polyisocyanate is based on the inclusion into the addition reaction, of hydrophilic components whose ionic or non-ionic polyethylene oxide segments, which act to disperse water, are incorporated into the structure of the polymer.

The incorporation of ionic or non-ionic hydrophilic groups makes the blocked polyisocyanates concerned in turn hydrophilic to such an extent that they form solutions or stable dispersions in water or in aqueous-alcoholic solutions or formulations and are compatible with formulations suitable for the coating of thermoplastics.

Short-chain polysiloxanes which are terminated by hydroxyl groups and are added according to the invention are in themselves known, low viscosity and water-clear liquids which are soluble in the aqueous-alcoholic solutions or formulations concerned. The chain length of the siloxane chain should be about 1 to 25, preferably 2–20, particularly preferably 4–15; materials of this type preferably have an average molecular weight of about 150 to 1,800. Possible substituents on the Si atom are preferably methyl. However, it is also possible to employ siloxanes which are such that they carry, for example, vinyl, phenyl, ethyl or propyl radicals.

Which organic solvents are used in addition to acetic acid is not critical. Suitable compounds for this purpose are alcohols, ketones, ethers and/or aromatic hydrocarbons. To prepare the coating agent ethanol and isopropanol from among these solvents are particularly preferred. The quantity of organic solvents must be sufficient to dissolve completely the partially hydrolyzed compound together with acetic acid and the other additives mentioned and to adjust the concentration of the partially hydrolyzed compound to about 5 to 15% by weight, calculated as solids and relative to the total weight of the coating agent.

To coat thermoplastics with the coating agent, according to the invention, any process, such as dipping, spraying and casting processes, can be used. Thermoplastic bodies thus coated are then heated to harden the coating agent. The hardening temperatures can customarily be carried out within the range of 60° to 140° C.

Because the shorter the hardening time the higher the hardening temperature required, it is preferred to harden the layer applied at a temperature which is as high as possible but lower than the heat distortion temperature of the thermoplastic. It is in general preferred to harden at 80° to 120° C. for 0.5 to 10 hours.

In the text which follows the invention is explained in still more detail:

Example

Preparation of the basic components:

(a) 19.8 g of glacial acetic acid, 210 g of distilled water and 227 g of isopropanol are added to 300 g of colloidal silicic acid having an $SiO_2$ content of 30% by weight. After the mixture has been mixed thoroughly a mixture of 900 g of methyltriethoxysilane and 1.5 g of a polydimethylsiloxane, according to the invention, which is terminated by hydroxyl groups and has an average chain length of 5.5 is added, and the total mixture is heated to 60° C. with stirring. The mixture is left for 4 hours at this temperature and a further 1,200 g of isopropanol are then added to the mixture. After the product has been cooled down to room temperature, the slightly opaque solution is filtered.

(b) 340 g of isopropanol, 190 g of tetraethoxysilane and 360 g of methyltriethoxysilane are initially introduced into a vessel which is equipped with a stirrer and a reflux condenser. 180 g of 0.05 N hydrochloric acid are added to this mixture, and to carry out the cohydrolysis the resulting mixture is heated for five hours under reflux. After the reaction, the mixture is cooled down to room temperature. A solution is obtained, which contains a partial hydrolyzate of tetraethoxysilane (5.1 percent, calculated as $SiO_2$) and a partial hydrolyzate of methyltriethoxysilane (12.6 percent, calculated as $CH_3SiO_{1.5}$).

(c1) 335 g of tetraethoxysilane and 167 g of methyltriethoxysilane are dissolved in 350 g of isopropanol, and 150 g of 0.05 N hydrochloric acid is added to the solution, and the resulting mixture is stirred at room temperature. After the reaction is complete, the mixture is left to stand for 24 hours at room temperature. The resulting solution contains a partial hydrolysis product of tetraethoxysilane (9.6%, calculated as $SiO_2$) and a partial hydrolysis product of methyltriethoxysilane (6.3%, calculated as $CH_3SiO_{1.5}$).

(c2) 415 g of tetraethoxysilane and 85 g of dimethyldiethoxysilane are dissolved in 350 g of isopropanol, and 150 g of 0.05 N hydrochloric acid are added, and the resulting mixture is stirred at room temperature. After the reaction is complete the mixture is left to stand for 24 hours. The resulting solution contains a partial hydrolysis product of tetraethoxysilane (12%, calculated as $SiO_2$) and a partial hydrolysis product of dimethyldiethoxysilane (4.2%, calculated as $(CH_3)_2SiO$).

Before use as a coating agent, the two components in accordance with (c) are mixed with one another in a ratio of 1:1 and dissolved in a mixture of 60 parts by weight of n-butanol, 40 parts by weight of acetic acid and 20 parts by weight of toluene.

The addition of a blocked polyisocyanate is carried out by simply mixing it with the finished basic component.

Preparation of a blocked isocyanate (1)

370 g of malonic acid diethyl ester are stirred at room temperature for 15 minutes with 2.7 g of sodium phenolate. 500 g of a buitized hexamethylene diisocyanate (23.8% of NCO groups) are added, and after the exothermic reaction has quieted down, the resulting mixture is further stirred for 3 hours at 90° C. 40 g of an ethylene oxide polyether (molecular weight=2,000) prepared with n-butanol as a starting material and 1 ml of tin(II) octoate are then added and the resulting mixture is stirred for 3 hours at 90° C. With the stirrer at a higher speed, a solution of 46 g of sodium 2,4-diaminobenzenesulphonate in 150 ml of water is then added, and the resulting mixture is stirred for 2 hours at 60° C. The mixture is then diluted with 800 ml of water and further stirred until a milky opaque emulsion is obtained. The emulsion contains about 50% by weight of solids. The content of blocked NCO groups is about 5%.

Preparation of a blocked isocyanate (2)

67.5 g of butane-1,3-diol are added dropwise at 120° C. to 333 g of isophorone diisocyanate. The resulting mixture is stirred for 2 hours and then cooled down to 90° C., and 187 g of malonic acid diethyl ester, in which 3 g of sodium phenolate have been dissolved beforehand, are added. The mixture is stirred for 3 hours at 90° C. A solution of 42 g of the sodium salt of 2-(2-aminoethylamino)-ethanesulphonic acid in 350 ml of isopropanol is then added while cooling to 70° C. The mixture is stirred for 2 hours, and a yellowish cloudy solution of a blocked polyisocyanate, which can be diluted with water, is obtained. Solids content: 70%. NCO content (blocked): 5.4%.

Preparation of a blocked isocyanate (3)

The procedure given in Example (1) is followed exactly, and after the sequence of reactions is complete 200 ml of isopropanol are added instead of 800 ml of water. A clear, yellow liquid which is diluted with water is obtained. The solution contains about 76% by weight of solids. The content of blocked NCO groups is 7.6%.

Coating of substrates and testing the properties of the coatings:

3 mm thick sheets of a commercially available polycarbonate (Makrolon ®) or of a polymethyl methacrylate are cleaned with water and isopropanol and then coated with the coating compositions. To harden the coating compositions the coated sheets are heated for 2 hours at 120° C. in a hot air drier.

After the hardening is complete, the coated sheets are stored for 2 days at room temperature and then subjected to the following experiments:

1. Adhesion to the substrate

The layer, applied to the sheet and hardened, is scored down to the substrate by means of a sharp blade in a crosswise manner so that 100 squares having an area of 1 mm² are formed. An adhesive cellophane tape is then stuck firmly onto the lines which have been cut in a crosswise manner and it is then pulled away at an angle of 90° to the applied layer. The process is repeated three times. The adhesion values obtained are divided into 5 classes from 1 (no delamination) to 5 (complete delamination), depending on the number of cells which remain.

2. Scratch resistance (abrasion experiment with steel wool)

The coated surface of the sheets is rubbed with a sample of 0000 fineness steel wool. The results are evaluated, in accordance with the categories which follow, as a function of the extent to which the surface has been scratched.

A = no scratches even on vigorous rubbing of the surface with steel wool
B = somewhat scratched on rubbing the surface with steel wool
C = readily scratched on moderate rubbing of the surface with steel wool 3. Push-pull method The abrasion resistance of a coating obtained by means of the coating composition of the invention is tested by means of an oscillatory abrasion test. This test is carried out in a special device which essentially consists of a rocking plate mounted within a housing and made to swing to and fro, with a frequency of 150 min⁻¹ and a stroke of 10 cm, by a motor. The coated substrate to be investigated is attached to this rocking plate. With the aid of an abrasive which is in pressure contact with the coated surface, the respective dulling of the surface after differing numbers of strokes, with the contact force of the abrasive being constant, is measured.

The dulling, caused by the abrasion, is measured in a photometer sphere in accordance with ASTM 1003. The dulling is measured on two samples in the as supplied state and after 5, 20 and 50 revolutions. The increase in dulling (difference between final dulling and dulling in the as supplied state) is indicated.

4. Trickling sand method

In the trickling sand test 3,000 g of sand (of 0.4–0.8 mm grain size) are allowed to free fall from a certain height (about 200 cm) and at a certain rate (200 g/min) onto the surface of the test piece which is at an angle of 45°. This produces abraded areas. Light is then shone onto the surface at an angle of 45°, and the intensity of the reflection at an angle of 45° is determined. The scratch resistance is determined from the percentage ratio of the reflection intensities after and before the test.

Results
Scratch-resistant coatings with and without additives

| Additive added to the basic component | % by weight addition | Adhesion grid cut (Test 1) | Scratch resistance steel wool (Test 2) | Push-pull method dulling in % (Test 3) | | Trickling sand method dulling in % (Test 4) |
|---|---|---|---|---|---|---|
| | | | | 20 strokes | 150 strokes | |
| without additive | — | 1 | B | 2.4 | 5.1 | 4.4 |
| with additive according to the invention corresponding to Example (a) | 0.9 | 1 | A | 0.2 | 1.0 | 2.5 |
| with additive according to the invention corresponding to Example (a) | 1.2 | 1 | A | 0.0 | 0.9 | 2.6 |

It will be appreciated that the instant specification and examples are set forth by way of illustration and not limitation, and that various modifications and changes may be made without departing from the spirit and scope of the present invention.

I claim:

1. A coating composition consisting of approximately
   (A) 10–40% by weight, relative to the total weight of the coating composition, of a partially hydrolyzed, siloxane compound which is obtained by hydrolysis in water at about 50°–80° C. for a period of about 1 to 12 hours of at least one of (a), (b), (c) or (d), wherein
       (a) is a hydrocarbon trialkoxysilane of the formula $R'Si(OR'')_3,$ wherein
       R' denotes an alkyl group having 1 to 4 carbon atoms, a phenyl group or vinyl group and
       R'' denotes an alkyl group having 1 to 4 carbon atoms,
       (b) is a co-condensation product of (a) and 1 to 40% of a phenyltrialkoxysilane or vinyltrialkoxysilane, wherein the alkoxy group contains 1 to 4 carbon atoms,
       (c) is a co-condensation product of 1 mol of (a) and 0.05 to 1 mol of a tetraalkoxysilane, wherein the alkoxy group contains 1 to 4 carbon atoms, and
       (d) is a co-condensation product of 1 mol of (a) and 0.05 to 1 mol of a dialkyldialkoxysilane, wherein the alkyl and alkoxy groups contain 1 to 4 carbon atoms,
   (B) 0 to 40% by weight, relative to the total weight of the coating compositions, of an aqueous dispersion of colloidal silicon dioxide.
   (C) 0 to 5% by weight, relative to the total weight of the coating agent, of an etherified methylolmelamine,
   (D) 0.05 to 15% by weight, relative to the total weight of the coating composition, of a blocked polyisocyanate, (E) 0.5 to 30% by weight, relative to the total weight of the coating composition, of acetic acid, and (F) 0.05 to 4% by weight, relative to the total weight of the coating composition, of a polysiloxane which is terminated by hydroxyl group, has an average chain length of between 1 to 25 and a molecular weight of 150 to 1800, and (G) an inert organic solvent as the remainder.

2. A thermoplastic article produced by coating the article with a composition according to claim 1 and heating.

3. An article according to claim 2, wherein the thermoplastic material comprises polycarbonate.

* * * * *